(12) United States Patent
Traidia et al.

(10) Patent No.: US 12,276,358 B2
(45) Date of Patent: Apr. 15, 2025

(54) CORROSION-FREE WELDED CONNECTION FOR REINFORCED THERMOPLASTIC PIPES (RTP)

(71) Applicant: SAUDI ARABIAN OIL COMPANY, Dhahran (SA)

(72) Inventors: Abderrazak Traidia, Lussan (FR); Thibault Villette, Belfort (FR); Abdullah Al Shahrani, Dammam (SA); Anwar Parvez, Dhahran (SA); Abdulaziz Y. Asiri, Dammam (SA); Chris Worrall, Cambridge (GB); Nicholas Iain Verge, Cambridgeshire (GB)

(73) Assignees: SAUDI ARABIAN OIL COMPANY, Dhahran (SA); TWI Ltd., Cambridge (GB)

( * ) Notice: Subject to any disclaimer, the term of this patent is extended or adjusted under 35 U.S.C. 154(b) by 28 days.

(21) Appl. No.: 18/164,031

(22) Filed: Feb. 3, 2023

(65) Prior Publication Data
US 2024/0263724 A1 Aug. 8, 2024

(51) Int. Cl.
*F16L 47/03* (2006.01)
*F16L 13/02* (2006.01)
(Continued)

(52) U.S. Cl.
CPC ......... *F16L 13/0209* (2013.01); *F16L 23/026* (2013.01); *F16L 47/03* (2013.01); *F16L 47/14* (2013.01)

(58) Field of Classification Search
CPC ............... F16L 13/0209; F16L 13/0218; F16L 13/0227; F16L 13/0236; F16L 13/0245; F16L 23/026; F16L 47/03
See application file for complete search history.

(56) References Cited

U.S. PATENT DOCUMENTS

| 170,473 A | 11/1875 | Flagler et al. |
| 2,142,150 A | 1/1939 | Replogle |

(Continued)

FOREIGN PATENT DOCUMENTS

| CA | 2116083 A1 | 8/1994 |
| CN | 1086763 A | 5/1994 |

(Continued)

OTHER PUBLICATIONS

Hamade, et al. "Rotary Friction Welding versus Fusion Butt Welding of Plastic Pipes—Feasibility and Energy Perspective"; ScienceDirect, Procedia Manufacturing 33, pp. 693-700 (8 pages).

(Continued)

*Primary Examiner* — Zachary T Dragicevich
*Assistant Examiner* — James A Linford
(74) *Attorney, Agent, or Firm* — Osha Bergman Watanabe & Burton LLP

(57) ABSTRACT

A connection system for reinforced thermoplastic polymer (RTP) pipe includes a first pipe with a first end and a reinforced thermoset resin (RTR) coupler positioned adjacent to the first end of the first pipe. The RTR coupler has an annular body with a first socket extension extending into the first end of the first pipe and a first thermoplastic tie layer provided between the first socket extension and the first end of the first pipe. A first set of wedges is positioned around an outer surface of the first end of the first pipe, and a first flange is fitted around the first set of wedges, wherein the first set of wedges is wedged between the first end and the first flange.

8 Claims, 10 Drawing Sheets

(51) Int. Cl.
*F16L 23/026* (2006.01)
*F16L 47/14* (2006.01)

(56) References Cited

U.S. PATENT DOCUMENTS

| | | | |
|---|---|---|---|
| 2,498,831 A | 2/1950 | Veitch | |
| 2,559,806 A | 7/1951 | Thompson | |
| 2,933,428 A | 4/1960 | Mueller | |
| 2,958,906 A | 11/1960 | Youthed | |
| 3,002,871 A | 10/1961 | Franz et al. | |
| 3,061,503 A | 10/1962 | Gould et al. | |
| 3,307,997 A | 3/1967 | Detrick | |
| 3,506,519 A | 4/1970 | Blumenkranz | |
| 3,946,761 A | 3/1976 | Thompson et al. | |
| 4,090,899 A | 5/1978 | Reich | |
| 4,165,104 A | 8/1979 | van den Beld | |
| 4,530,521 A | 7/1985 | Nyffeler et al. | |
| 4,619,470 A * | 10/1986 | Overath | F16L 23/02 |
| | | | 285/55 |
| 4,662,655 A | 5/1987 | Fliervoet et al. | |
| 4,690,434 A | 9/1987 | Schmidt | |
| 4,702,498 A * | 10/1987 | Mueller | F16L 47/14 |
| | | | 285/55 |
| 4,865,674 A | 9/1989 | Durkin | |
| 5,106,130 A | 4/1992 | Ellsworth et al. | |
| 5,152,855 A | 10/1992 | Jansman et al. | |
| 5,186,500 A | 2/1993 | Folkers | |
| 5,213,379 A | 5/1993 | Taniguchi et al. | |
| 5,264,059 A | 11/1993 | Jacaruso et al. | |
| 5,520,422 A | 5/1996 | Friedrich et al. | |
| 5,549,949 A * | 8/1996 | Williams | F16L 47/02 |
| | | | 156/330 |
| 5,758,731 A | 6/1998 | Zollinger | |
| 5,785,092 A | 7/1998 | Friedrich et al. | |
| 5,951,812 A | 9/1999 | Gilchrist, Jr. | |
| 6,131,954 A | 10/2000 | Campbell | |
| 6,521,072 B1 | 2/2003 | Campbell | |
| 6,832,785 B1 | 12/2004 | Zitkovic, Jr. | |
| 7,240,697 B2 | 7/2007 | Beebe et al. | |
| 8,418,728 B1 | 4/2013 | Kiest, Jr. | |
| 8,424,924 B2 | 4/2013 | LaMarca et al. | |
| 8,522,827 B2 | 9/2013 | Lazzara et al. | |
| 8,746,747 B2 | 6/2014 | McPherson | |
| 9,285,063 B2 | 3/2016 | Jones | |
| 9,358,764 B2 | 6/2016 | Prebil et al. | |
| 9,523,447 B2 | 12/2016 | Conrad | |
| 9,528,638 B2 | 12/2016 | Hooberman | |
| 9,534,719 B2 | 1/2017 | Eccleston et al. | |
| 9,810,359 B2 | 11/2017 | Spears et al. | |
| 11,754,215 B2 | 9/2023 | Traidia et al. | |
| 12,055,253 B2 | 8/2024 | Worrall et al. | |
| 2003/0155768 A1* | 8/2003 | Hollingsworth | F16L 47/02 |
| | | | 285/333 |
| 2004/0222627 A1 | 11/2004 | Krah | |
| 2006/0049631 A1 | 3/2006 | Tolhoek | |
| 2006/0255590 A1 | 11/2006 | Ludeman | |
| 2006/0279084 A1 | 12/2006 | Collins | |
| 2008/0187697 A1 | 8/2008 | Amano | |
| 2009/0277579 A1 | 11/2009 | Marelli et al. | |
| 2010/0295299 A1 | 11/2010 | Ziu | |
| 2013/0036604 A1 | 2/2013 | Schmidt et al. | |
| 2013/0140811 A1 | 6/2013 | Fahrer et al. | |
| 2013/0175797 A1 | 7/2013 | Kanao | |
| 2014/0137971 A1 | 5/2014 | Lundman | |
| 2014/0220356 A1 | 8/2014 | Van Tooren | |
| 2014/0363220 A1 | 12/2014 | Auer et al. | |
| 2014/0375047 A1 | 12/2014 | Jones | |
| 2015/0219254 A1 | 8/2015 | Lee et al. | |
| 2019/0128458 A1 | 5/2019 | Kimball et al. | |
| 2024/0018346 A1 | 1/2024 | Kaarto | |

FOREIGN PATENT DOCUMENTS

| | | | | |
|---|---|---|---|---|
| CN | 1263977 C | | 7/2006 | |
| CN | 104708890 B | | 12/2018 | |
| CN | 110131511 A | | 8/2019 | |
| CN | 110823481 A | | 2/2020 | |
| DE | 939719 C | | 3/1956 | |
| DE | 1018681 B | * | 10/1957 | |
| DE | 9107311 U1 | * | 6/1991 | |
| DE | 4123383 A1 | * | 1/1993 | B29C 65/342 |
| DE | 29706501 U1 | * | 10/1997 | B29C 65/342 |
| DE | 19911284 A1 | | 9/2000 | |
| DE | 102010029715 A1 | * | 12/2011 | F16L 47/03 |
| EP | 0382593 A2 | | 8/1990 | |
| EP | 3717736 B1 | | 3/2022 | |
| EP | 4263183 A1 | | 10/2023 | |
| GB | 775223 A | | 5/1957 | |
| GB | 775233 A | | 5/1957 | |
| GB | 1329364 A | | 9/1973 | |
| GB | 1520320 A | * | 8/1978 | B29C 57/005 |
| GB | 2033394 A | | 5/1980 | |
| GB | 2271958 A | | 5/1994 | |
| GB | 2425337 A | | 10/2006 | |
| JP | H10281383 A | | 10/1998 | |
| JP | 2002295780 A | | 10/2002 | |
| JP | 2003130276 A | | 5/2003 | |
| JP | 2009018576 A | | 1/2009 | |
| WO | 9626380 A1 | | 8/1996 | |
| WO | 0055538 A1 | | 9/2000 | |
| WO | 2005025836 A1 | | 3/2005 | |
| WO | 2008028224 A1 | | 3/2008 | |
| WO | 2009007537 A1 | | 1/2009 | |
| WO | 2010033163 A2 | | 3/2010 | |
| WO | 2012137197 A2 | | 10/2012 | |
| WO | 2020007924 A1 | | 1/2020 | |
| WO | 2022020323 A1 | | 1/2022 | |
| WO | 2022133272 A1 | | 6/2022 | |

OTHER PUBLICATIONS

Dell'Anna et al., "Lay-Up and Consolidation of a Composite Pipe by In Situ Ultrasonic Welding of a Thermoplastic Matrix Composite Tape"; Materials 2018 (11 pages).

Ageorges et al., "Advances in Fusion Bonding Techniques for Joining Thermoplastic Matrix Composites: a review"; Elsevier Science Ltd. 2001 (19 pages).

Beiss et al., "Vibration Joining of Fiber-Reinforced Thermosets"; Polymer Composites 2010 (8 pages).

Hou, Meng "Thermoplastic Adhesive for Thermosetting Composites"; Materials Science Forum vols. 706-709, pp. 2968-2973 (7 pages).

International Search Report and Written Opinion of International Application No. PCT/US2021/042296, mailed Oct. 14, 2021 (14 pages).

International Search Report and Written Opinion of International Application No. PCT/US2021/042308, mailed Oct. 15, 2021 (14 pages).

International Search Report and Written Opinion of International Application No. PCT/US2021/042330, mailed Oct. 15, 2021 (24 pages).

Van Moorleghem, Régis, "Welding of Thermoplastic to Thermoset Composites Through a Thermoplastic Interlayer"; Delft University of Technology (67 pages).

Nomura et al., "Linear Vibration Welding of Polyethylene Pipes"; In Proceedings of the 10th Plastic Pipes, Plastic Pipes Conference Association, Gothenburg, Sweden, Sep. 1998, pp. 669-678 (10 pages).

O. Schieler et al., "Induction Welding of Hybrid Thermoplastic-thermoset Composite Parts"; KMUTNB Inst J Appl Sci Technol, vol. 9, No. 1, pp. 27-36, 2016 (10 pages).

Troughton et al., "Linear Vibration Welding of Polyethylene Pipes"; In Proceedings of the 10th Plastic Pipes, Plastic Pipes Conference Association, Gothenburg, Sweden, Sep. 1998, pp. 424-432 (9 pages).

Villegas et al., "Ultrasonic Welding of Carbon/Epoxy and Carbon/PEEK Composites Through a PEI Thermoplastic Coupling Layer"; Composites: Part A (2018) (32 pages).

Yousefpour et al., "Fusion Bonding/Welding of Thermoplastic Composites"; Journal of Thermoplastic Composite Materials, vol. 17—Jul. 2004 (39 pages).

(56) References Cited

OTHER PUBLICATIONS

Office Action issued in U.S. Appl. No. 17/644,194; dated Oct. 31, 2023 (30 pages).

Office Action issued by the Canadian Patent Office for corresponding Canadian patent application No. 3,202,835, mailed Oct. 28, 2024 (5 pages).

International Search Report and Written Opinion issued in Application No. PCT/US2024/014010, mailed on May 8, 2024 (14 pages).

* cited by examiner

CORROSION-FREE WELDED CONNECTION FOR REINFORCED THERMOPLASTIC PIPES (RTP)

BACKGROUND

Reinforced Thermoplastic Polymer (RTP) pipes are extensively used in the oil and gas and petrochemical industry for the transport of various fluids such as water, crude oil, gas and chemicals. FIG. 1 illustrates a typical layer structure of RTP pipe. As shown, typical RTP pipe 10 includes an inner thermoplastic liner 12, a fiber reinforcement layer 14 layered around the inner thermoplastic liner 12, and an external thermoplastic jacket 16 layered around the fiber reinforcement layer 14. Inner thermoplastic liners may be made of, for example, polyethylene, polyvinyl chloride, polypropylene, polyurethane, polyamide, and/or polyvinylidene fluoride, using an extrusion process to form a tubular, pipe shape. The fiber reinforcement layer 14 may be made of, for example, polyethylene, aromatic polyamide, polyester, polyamide, glass, carbon, and/or metal fibers, by winding or weaving lengths of the fibers around the inner thermoplastic liner. The external thermoplastic jacket 16 may be made of, for example, polyethylene, polyvinyl chloride, polypropylene, polyurethane, and/or polyamide, using an extrusion process.

Compared to other nonmetallic pipes such as Reinforced Thermoset Resin (RTR) pipes, RTP pipe presents some flexibility that allows spooling, and thus transport of significant lengths (e.g., several hundreds of meters long seamless pipe) of RTP on a spool. Because the spooling capability of RTP pipe allows for long seamless lengths of pipe to be made, the need for connections is reduced since one connection may only be needed every few hundred meters. For example, in contrast to RTP pipes, RTR pipes are generally produced in rigid segments of about 10-12 meters in length and transported onsite before being eventually assembled (jointed) to each other to the required length.

Although the number of connections needed for RTP pipe may be reduced, connections remain the weak link of the pipeline, where the probability of leakage is much higher than anywhere else in the pipe.

There have been many attempts to develop RTP connections that exhibit both high mechanical performances, while showing good sealing properties and corrosion resistance to the transported fluids. The design of RTP connections and associated know how is often proprietary to the individual RTP suppliers with little or no standardization (unlike other types of composite pipe technologies, such as RTR).

In general, known RTP connections can be grouped into three main categories: metallic connections, fiber reinforced thermoset connections, and thermoplastic couplers. Metallic connections provide excellent mechanical and thermal resistance but are prone to corrosion damage over time when exposed to transported hydrocarbons or harsh environmental conditions. Fiber reinforced thermoset connections (such as Glass Reinforced Epoxy (GRE)) show acceptable mechanical and thermal performances but cannot be directly welded to an RTP pipe since thermoset polymer cannot be welded. Thermoplastic couplers (often unreinforced) are used to join thermoplastic pipes via thermal welding (e.g., electrofusion). However, the relatively low mechanical and thermal performances of the resulting connection leads to the operational envelop of the system being limited, and therefore pressure rating of the system is often limited by the pressure rating of the coupler itself.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to a connection system for reinforced thermoplastic polymer (RTP) pipe. The connection system may include a first pipe having a first end and a reinforced thermoset resin (RTR) coupler positioned adjacent the first end of the first pipe. The RTR coupler includes an annular body with a first socket extension extending into the first end of the first pipe and a first thermoplastic tie layer provided between the first socket extension and the first end of the first pipe. Connection systems may further include a mechanical connection system used in combination with the coupler. Such mechanical connection systems may include a first set of wedges positioned circumferentially around an outer surface of the first end of the first pipe, and a first flange fitted around the first set of wedges, wherein the first set of wedges is wedged between the first end and the first flange.

In another aspect, embodiments of the present disclosure relate to methods for connecting RTP pipe using a coupler having an annular body with a first socket extension comprising a first thermoplastic material provided around an outer surface. Methods may include fitting a first end of a first pipe around the first socket extension, wherein the first pipe has an inner surface made of a pipe thermoplastic material, and applying heat to the fitted first end to thermoplastic weld the inner surface of the first end to the first thermoplastic material of the first socket extension.

In yet another aspect, embodiments of the present disclosure relate to pipe connection devices. Connection devices may have an annular body with an inner surface defining an inner diameter of the annular body, a first radial extension extending a radial distance from the inner surface, a first socket extension extending axially from a first side of the first radial extension, and a first thermoplastic tie layer bonded around an outer surface of the first socket extension, wherein the first thermoplastic tie layer comprises a thermoplastic material and a susceptor material, and wherein the annular body is formed of a reinforced thermoset resin (RTR) material.

Other aspects and advantages of the claimed subject matter will be apparent from the following description and the appended claims.

DETAILED DESCRIPTION

Figure 1:
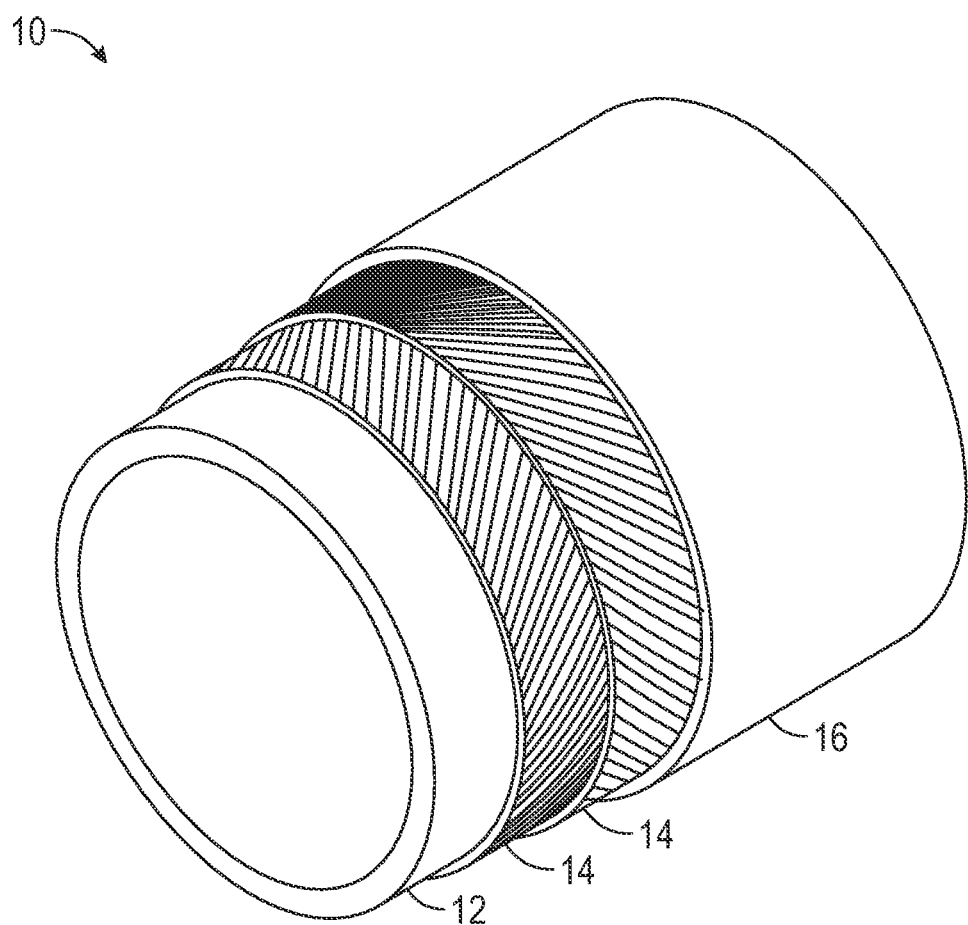
FIG. 1 shows the structure of conventional RTP pipe.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 2A-8, components described with regard to a figure, in various embodiments disclosed herein, may be equivalent to one or more like-named components described with regard to any other figure. For brevity, descriptions of these components may not be repeated for each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

In one aspect, embodiments disclosed herein relate to a corrosion-free system and method for the mechanical coupling (to withstand axial and hoop stresses) and sealing (to prevent fluid ingress across the joint) of two RTP (reinforced thermoplastic polymer) pipe ends. Connectors, systems, and methods disclosed herein include coupling and sealing RTP pipes by leveraging the structural features of reinforced thermosetting materials and the weldability and sealing performance of thermoplastic materials. Connection systems and methods according to embodiments of the present disclosure may alleviate corrosion issues otherwise apparent with metallic connections, alleviate failures due to mechanical or thermal loads that may otherwise occur in thermoplastic connections, and provide optimal sealing, as observed with systems capable of thermoplastic welding.

Connection Systems

According to embodiments of the present disclosure, a connection system for joining two RTP (reinforced thermoplastic polymer) pipe may include an RTR (reinforced thermoset resin) coupler positioned between the ends of the two RTP pipe. RTP pipe refers to pipe formed of concentric layers of multiple materials, generally including an inner liner and an outer jacket both made of thermoplastic material. The coupler may include a body made of RTR material, where connection ends of the RTR coupler are modified to be weldable to the RTP pipes using thermoplastic tie layers. In some embodiments, a coupler may be made entirely of an RTP material, which may eliminate the need to add the sacrificial tie layer for welding to the liner (assuming the two thermoplastics are weld-compatible). By providing thermoplastic connection ends of a coupler that fit against the thermoplastic material of the RTP pipe being connected, the thermoplastic connection ends may be melted with the interfacing thermoplastic material of the RTP pipe to "weld" the connection ends of the coupler to the ends of the RTP pipe, thereby connecting the RTP pipe together.

According to embodiments disclosed herein, in addition to using thermoplastic welding to connect RTP pipe to a coupler, connection systems disclosed herein may also include mechanical connection components. For example, connection systems disclosed herein may include a mechanical connection system of wedges and flanges that are secured around the welded connection ends between the coupler and RTP pipe.

Figure 2A:
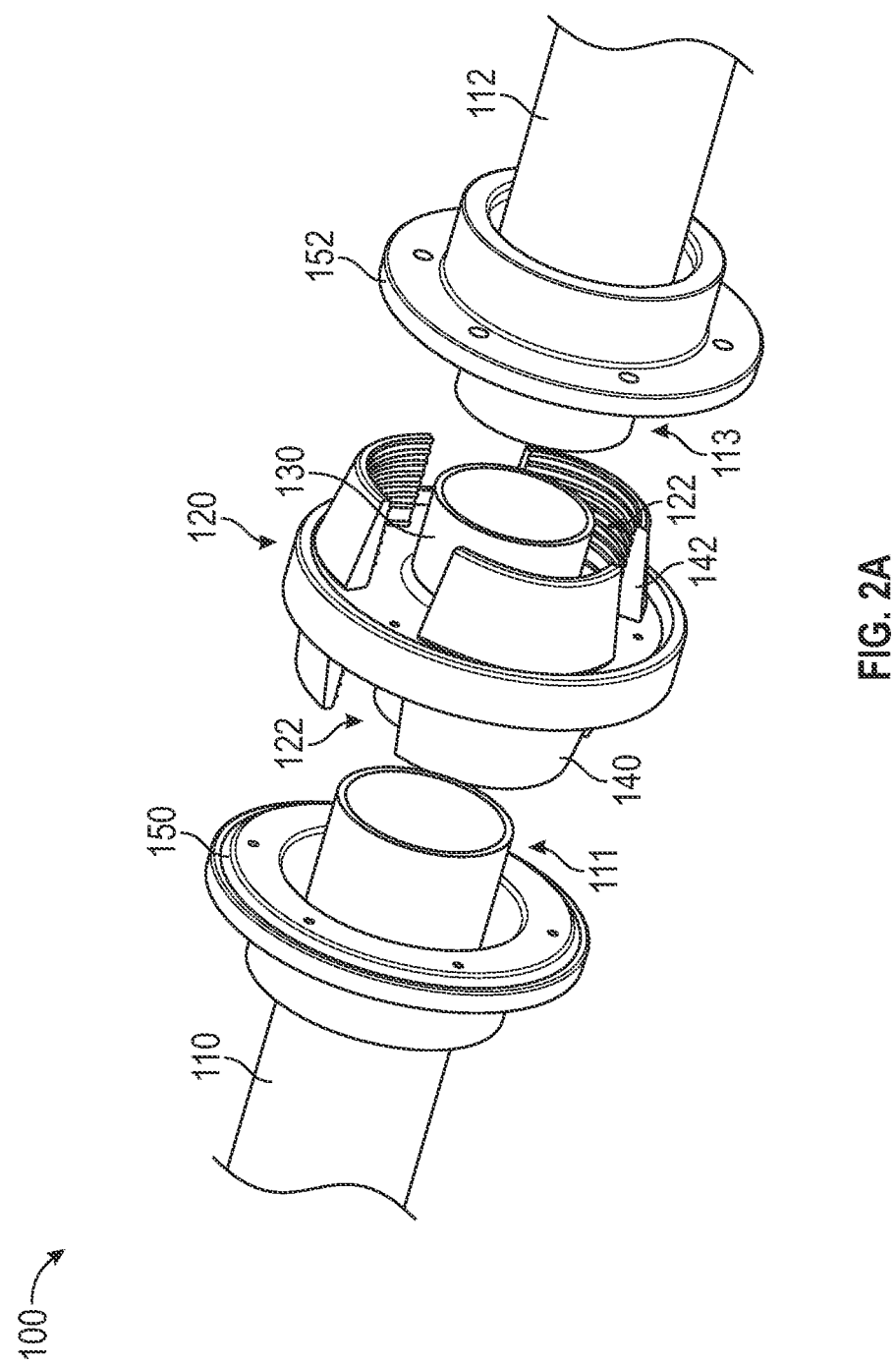
FIG. 2A shows an exploded view of a connection system according to embodiments of the present disclosure.
Figure 2B:
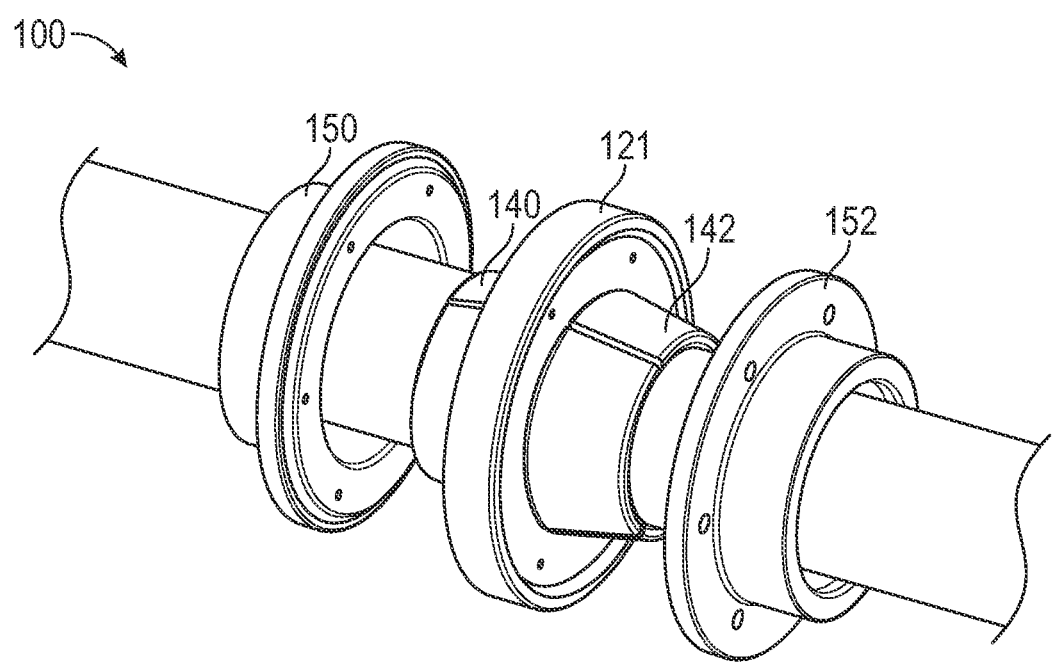
FIG. 2B shows the connection system of FIG. 2A in a partially assembled configuration.
Figure 2C:
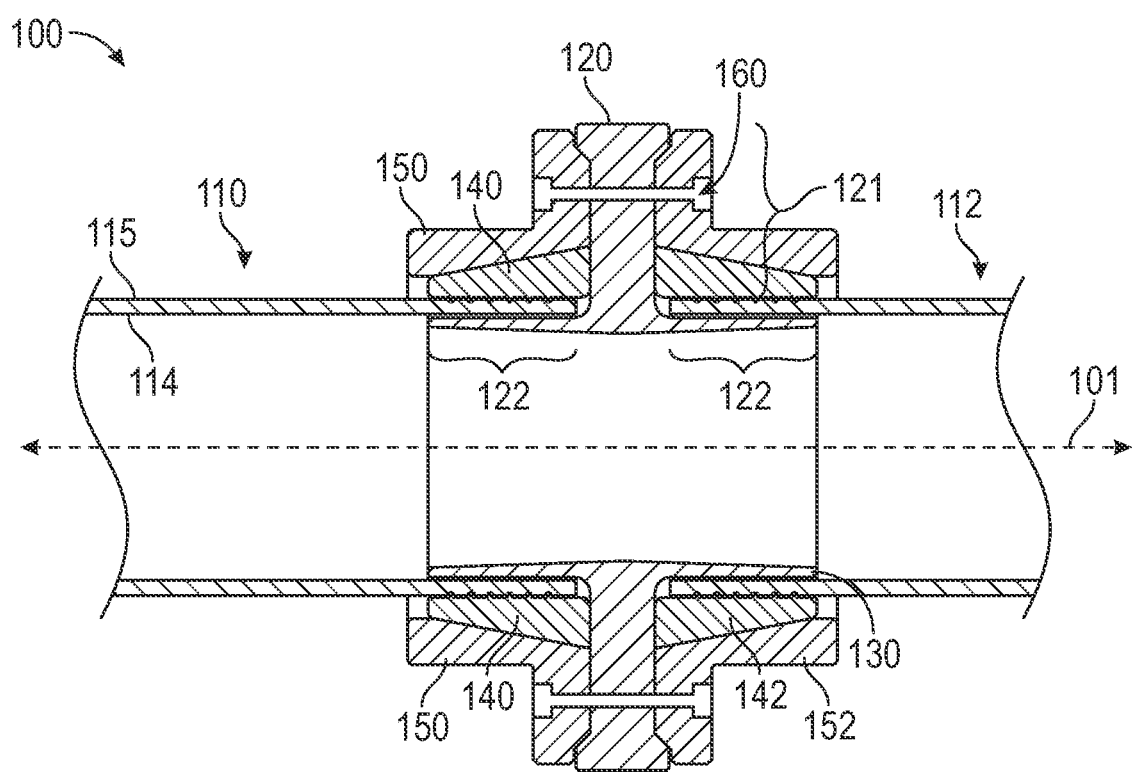
FIG. 2C shows a cross-sectional view of the connection system of FIGS. 2A-B in an assembled configuration.

FIGS. 2A-C show an example of a connection system according to embodiments of the present disclosure utilizing both thermoplastic welding and a mechanical connection system to secure the ends of RTP pipe to a coupler. Particularly, FIG. 2A shows an exploded perspective view of the connection system 100 prior to connection, FIG. 2B shows a perspective view of the connection system 100 in a partially assembled configuration, and FIG. 2C shows a cross-sectional view of the connection system 100 after connection.

As shown, the connection system 100 includes a first RTP pipe 110 having a first end 111, a second RTP pipe 112 having a second end 113, and a coupler 120. The first and second ends 111, 113 of the RTP pipe are open and sized to fit against the coupler 120. In FIGS. 2A-C, for simplicity of the drawing, the multiple material layers of the RTP pipe are not shown. However, the first and second RTP pipe 110, 112 include multiple layers of materials concentrically layered around each other, where the inner surface 114 and the outer surface 115 of the RTP pipe are both formed by layers (an inner liner layer and an outer jacket layer, respectively) of thermoplastic material. Thermoplastic material forming the inner and/or outer surfaces 114, 115 of the RTP pipe may be selected from at least one of polyethylene (PE), polyvinylidene fluoride (PVDF), polyphenylene sulfide (PPS), polyaryletherketone (PAEK), polyamide (PA), polyether ether ketone (PEEK), acrylonitrile butadiene styrene (ABS), polypropylene (PP), or other thermoplastic polymers known in the art.

The coupler 120 generally includes an annular body having a radial extension 121 and two socket extensions 122 extending in opposite axial directions, where the size and shape of the socket extensions 122 are designed to mate with the open ends 111, 113 of the RTP pipe 110, 112. According to embodiments of the present disclosure a radial extension may extend in a direction that is generally perpendicular to the direction in which an adjacent socket extension extends. However, other embodiments may include a radial extension extending in a different angle relative to the extension direction of the socket extension. As discussed in more detail below, the shape and orientation of a radial extension may be provided to correspond with a mating surface of a component (e.g., flange) used to mechanically connect the pipe to the coupler in the mechanical connection system.

The coupler body may be formed of an RTR material, which may include, for example, a reinforcement fiber (e.g., glass, carbon fibers, or other reinforcement fibers known in the art) in a resin matrix of a thermoset polymer (e.g., polyesters, vinyl-esters, epoxies, or other thermoset polymer known in the art). The socket extensions 122 are each functionalized to have thermoplastic connection surfaces covering the RTR material by joining a layer of thermoplastic material to the socket extensions 122, where the thermoplastic connection surfaces on the socket extensions 122 are designed to interface with thermoplastic connection surfaces on the RTP pipe 110, 112. In such manner, thermoplastic tie layers 130 can be provided between the socket extensions 122 and the ends 111, 113 of the RTP pipe 110, 112.

For example, as shown in FIG. 2A, a thermoplastic tie layer 130 may be bonded around the outer surfaces of the socket extensions 122 to provide thermoplastic connection surfaces on the coupler 120. When thermoplastic connection surfaces are provided around the exterior of the socket extensions 122, the functionalized socket extensions 122 may be inserted into the ends 111, 113 of the RTP pipes such that the exterior thermoplastic connection surfaces of the socket extensions 122 interface with the inner thermoplastic connection surfaces of the RTP pipe ends 111, 113. As shown in FIG. 2C, the interfacing thermoplastic connection surfaces may be melted to thermoplastic weld the socket extensions 122 to the ends of the RTP pipe 110, 112. Methods of providing thermoplastic connection surfaces on RTR material of the socket extensions are described below.

According to embodiments of the present disclosure, a thermoplastic tie layer (e.g., thermoplastic tie layer 130) may be made of the same thermoplastic material as the inner liner of the RTP pipes being connected or a different thermoplastic material that is thermoplastic weldable to the RTP pipes being connected.

By integrating thermoplastic connection surfaces on an RTR coupler body made of RTR material, a coupler having relatively higher strength, chemical resistance, and temperature resistance (provided from the RTR material) compared to RTP material may be provided with an integrated weldeable interface to permanently connect and seal to RTP pipe. Thus, according to embodiments of the present disclosure, couplers having a body made of RTR material and thermoplastic connection surfaces may be designed to have sufficient strength in the axial direction to transfer increased loads from one pipe to the other. Additional examples of and a more detailed discussion of couplers according to embodiments of the present disclosure and methods of making such couplers is provided below following the discussion of the connection system overview.

In other embodiments, a coupler body (including its socket extensions) may be formed entirely of RTP material, which may eliminate the need to add the sacrificial tie layer for welding to RTP pipe when the coupler and pipe thermoplastics are weld compatible. However, commodity thermoplastics usually exhibit lower mechanical and thermal resistance compared to thermosets, and specialty thermoplastic polymers with higher strength and/or thermal resistance than commodity thermoplastics, such as PPS, PVDF, PEEK, etc., typically come at cost.

The connection system 100 shown in FIGS. 2A-C also includes a mechanical connection system to mechanically connect the RTP pipes 110, 112 to the coupler 120 in addition to thermoplastic welding the RTP pipes 110, 112 to the coupler 120. As shown, the mechanical connection system includes an assembly of wedges 140, 142 and flanges 150, 152 secured and tightened around the ends 111, 113 of the RTP pipes 110, 112 to mechanically connect the ends 111, 113 of the RTP pipes 110, 112 to the coupler 120.

According to embodiments of the present disclosure, after a socket extension of a coupler has been thermoplastic welded to an RTP pipe, a set of wedges may be arranged around the coupler/pipe connection. For example, as shown in FIG. 2B, after the socket extensions 122 of the coupler 120 are thermoplastic welded to the RTP pipes 110, 112, wedges are arranged as a first set of wedges 140 positioned circumferentially around an outer surface of the first end 111 of the first pipe 110 and a second set of wedges 142 positioned circumferentially around an outer surface of the second end 113 of the second pipe 112. The wedges may be equally spaced around the outer circumference of the pipe ends. Additionally, the wedges may be sized and provided in different amounts according to the size of the pipes being connected. For example, two or three or more wedges may be provided around the pipe ends. In some embodiments, such as shown in FIG. 2B, the size and shape of the wedges 140, 142 are designed to fit adjacent to each other (with no circumferential spacing between adjacent wedges) when they are assembled around the coupler/pipe connection. In such embodiments, an assembled set of wedges 140, 142 extends around the entire outer circumference of coupler/pipe connection without any circumferential spacing between adjacent wedges.

The size of the wedges may be selected, for example, based on the size of the pipes being connected and/or desired pressure rating of the connection. For example, the wedge length (as measured in the direction parallel with the central axis of the pipe being connected) may be designed based on the pipe dimeter and pressure rating, where relatively larger diameter pipes with relatively higher pressure rating will use relatively longer wedges to transfer higher loads.

After wedges have been assembled around a coupler/pipe thermoplastic connection, a flange may be fitted around the assembled wedges. For example, as shown in FIG. 2C, after the wedges 140, 142 are assembled around the coupler/pipe thermoplastic connections, a first flange 150 is fitted around the first set of wedges 140 such that the first set of wedges 140 is wedged between the first end 111 of the first pipe 110 and the first flange 150, and a second flange 152 is fitted around the second set of wedges 142 such that the second set of wedges 142 is wedged between the second end 113 of the second RTP pipe 112 and the second flange 150.

The flanges 150, 152 are designed so that they squeeze and tie the wedges 140, 142 to ensure the pipe ends 111, 113 are firmly and permanently connected. For example, in the embodiment shown, each flange 150, 152 has a sloped inner surface that corresponds with and interfaces with a sloped outer surface of the wedges 140, 142. The sloped surfaces are configured to have the thicker end of the wedges positioned proximate to the radial extension 121 portion of the coupler annular body and the thinner end of the wedges positioned distal from the radial extension 121 of the annular body of the coupler 120. As the flanges 150, 152 are tightened together (in a direct toward the radial extension 121 portion of the annular body), the sloped inner surfaces of the flanges 150, 152 exert a force on the wedges 140, 142 in an axial direction towards the radial extension 121 portion of the annular body and in a radial direction inward towards the socket extensions 122. In such manner, the flanges 150, 152 squeeze the wedges 140, 142, which compresses the ends 111, 113 of the RTP pipe 110, 112 between the wedges 140, 142 and the socket extensions 122.

The second flange 152 is connected to the first flange 150 using at least one connector to hold and tighten the flanges 150, 152 together around the wedges 140, 142 and the radial extension 121 portion of the coupler 120. For example, in the embodiment shown, a plurality of correspondingly positioned holes are formed through the flanges 150, 152 and the coupler 120, such that when the flanges 150, 152 are positioned around and aligned with the coupler 120, circumferentially spaced through-holes 160 are formed through the flange-coupler assembly. A connector (e.g., a bolt and nut assembly) may then be inserted through the through-holes 160 to tighten the first and second flanges 150, 152 against opposite sides of the radial extension 121 portion of the coupler 120. Thus, as shown in FIG. 2C, a connection system may include a coupler having a portion of the annular body sandwiched between a first flange and a second flange, wherein the first and second flanges are connected together via a connector extending through the portion of the annular body.

According to embodiments of the present disclosure, flanges may have various sizes and shapes capable of tightening around a set of wedges. Additionally, flanges may have a coupler connection side with different shapes or sizes that mates with or corresponds with a radial extension of a coupler. For example, mating interlocking features may be provided on a coupler connection side of a flange and a radial extension of a coupler, where the interlocking features may lock to connect the flange to the coupler. As another example, threaded extensions may be integrally formed along the coupler connection side of a flange, where the threaded extensions may align with holes positioned circumferentially around the radial extension of a coupler. The threaded extensions of the flange may be inserted through the holes of the coupler radial extension, and nuts may be tightened to the threaded extensions to tighten the flange to the coupler.

Additionally, as shown in FIG. 2C, when the connection system is assembled together, the coupler 120 is positioned between the first end 111 of the first pipe 110 and the second end 113 of the second pipe 112, where a flow path is formed through the RTP pipe and coupler. When the connection system is designed to have the socket extensions 122 inserted into the interior of the RTP pipe 110, 112, such as shown in FIG. 2C, the flow path may have a reduced diameter along the coupler portion of the flow path, according to the thickness of the socket extensions 122. Additionally, when the RTP pipe 110, 112 is connected to the coupler 120, as shown in FIG. 2C, the RTP pipe 110, 112 are coaxial with the socket extensions 122 about a central axis 101.

Figure 3:
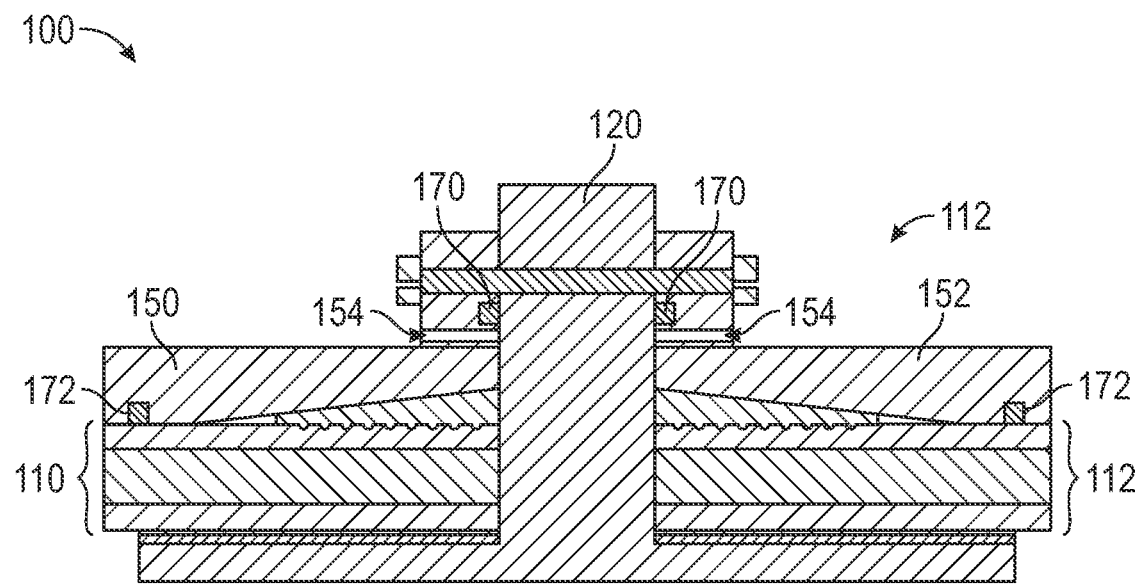
FIG. 3 shows a partial cross-sectional view of a connection system according to embodiments of the present disclosure.

In some embodiments, such as shown in FIG. 3, the connection system 100 may utilize flanges 150, 152 having one or more vent ports 154 formed therethrough. As shown in FIG. 3, a vent port 154 extends through each of the first flange 150 and second flange 152, wherein the vent port 154 fluidly connects an exterior of each flange 150, 152 to an interface between the flange and the annular body of the coupler 120. Particularly, in the embodiment shown, the coupler 120 includes a radial extension 121 that extends radially outwardly and is sandwiched between the two flanges 150, 152, such that the vent ports 154 interface with the radial extension 121 portion of the coupler 120. The exterior of the vent ports 154 may be fluidly connected to a gas collection system, a storage container, or other component (not shown) located exterior to the flanges. In such manner, fluid trapped between the flanges and the coupler 120 may flow through the vent ports 154 to another fluidly connected system, e.g., to be stored, reused, and/or redirected back into the pipes.

Additionally, the connection system 100 shown in FIG. 3 includes o-ring seals 170, 172 positioned along interior surfaces of the flanges 150, 152 to prevent ingress of external fluid. For example, as in the embodiment shown, first o-ring seals 170 are positioned between the radial ends of the flanges 150, 152 and the radial extension 121 of the coupler, and second o-ring seals 172 are positioned between the axial ends of the flanges 150, 152 and the RTP pipe 110, 112. While o-ring sealing components are shown in FIG. 3, other sealing components may be used to prevent fluid ingress into the flange connection, including, for example, a sealing compound such as grease.

Vent port(s) 154 may be formed through the flanges 150, 152 at a position between the sealing components. In RTP pipes, a small fraction of the transported gases can sometimes permeate through the inner liner and then travel axially along the pipe annulus (e.g., in unbonded pipes) to end up at the pipe to pipe connector. Accordingly, vent ports may be added to the connection, such as shown in FIG. 3, in order to collect the permeated gases (e.g, for collection or re-injection).

According to some embodiments of the present disclosure, the wedges and flanges may be made of a non-metallic material (e.g., with piping having lower pressure requirements). For example, wedges and/or flanges may be made of RTR material such as glass-reinforced epoxy or carbon-reinforced epoxy, or RTP material such as short or continuous fiber reinforced thermoplastic material, carbon-reinforced PEEK, or carbon-reinforced PPS. By using non-metallic material to form the wedges and flanges, the connection system 100 may be fully non-metallic, which would provide immunity to external corrosion. Moreover, a fully nonmetallic connection may be significantly lighter than its metallic equivalent, which may provide logistic advantages (e.g., for transportation, handling, etc.). In other embodiments, the wedges and/or flanges may be metallic.

Connection systems such as shown in FIGS. 2A-3 may have sufficient strength in the axial direction to transfer loads from one pipe to the other. Part of an axial load through the connected pipes 110, 112 may be transferred through the thermoplastic welded surface between the coupler 120 and the RTP pipe 110, 112, while a majority of the axial load may be transferred through the wedges 140, 142 in the mechanical connection system.

The embodiments shown in FIGS. 2A-3 show connection systems that generally include (1) a coupler made of a reinforced thermoset body with modified surface ends to allow "weldability" to thermoplastic layers of to-be-jointed RTP pipes, (2) a series of wedges assembled around the circumference of the RTP pipe outer surface, (3) optional sealing components to prevent ingress of external fluid into the RTP structure, and (4) external flanges to allow full assembly of the system using bolts. Thus, in the embodiments shown in FIGS. 2A-3, the connection systems use a mechanical connection system that includes a series of flanges and wedges, and optional sealing components, to enable a tight mechanical interlock between the coupler and the RTP pipe. However, other mechanical connection systems may be envisioned without departing from the scope of this disclosure. For example, different types of flange connectors may be used to tighten flanges around wedges or different types of mechanical tightening components may be used such as components that are radially adjustable/tightened (e.g., as used with hose clamps). By integrating a mechanical connection system with the thermoplastic welded connection system, the connection system may have both improved strength and sealing performance.

Figure 4A:
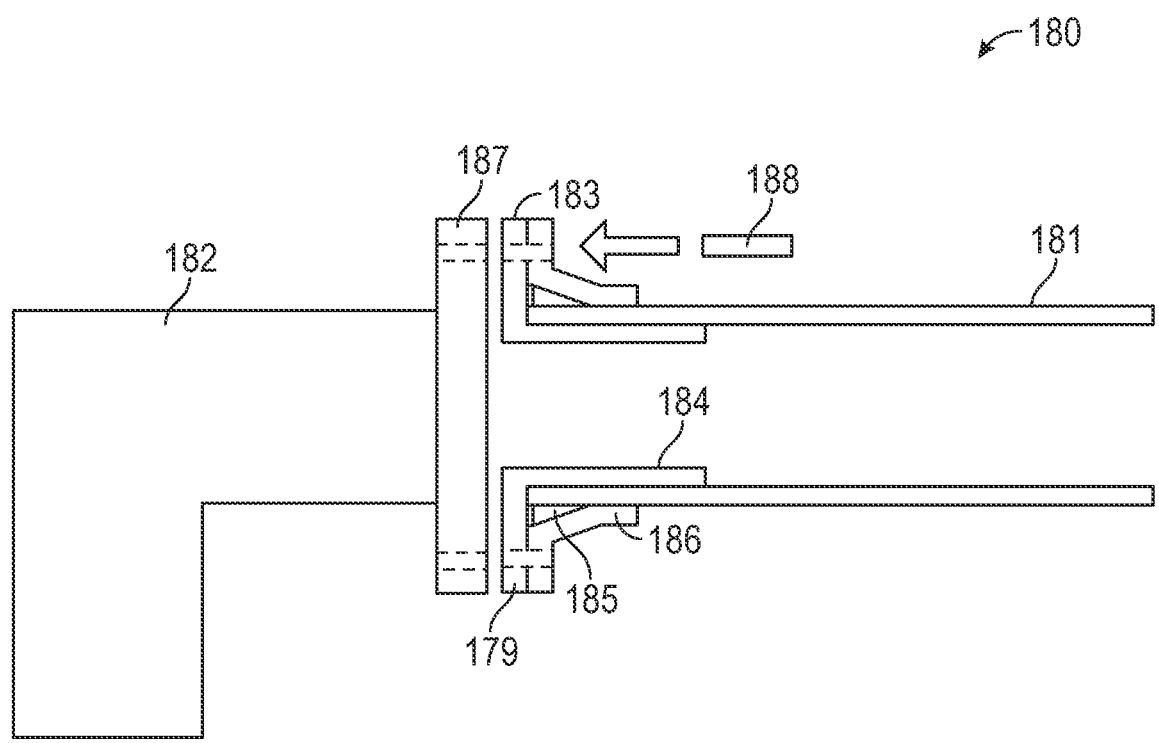
FIG. 4A shows a cross-sectional view of a coupler according to embodiments of the present disclosure.

Additionally, connection systems utilizing a combination of thermoplastic welding and mechanical connection components according to embodiments of the present disclosure may be used for different types of pipe connections, such as a turn connection or a terminal connection. For example, FIG. 4A shows an example of a connection system 180 according to embodiments of the present disclosure used for a pipe terminal connection, where the connection system 180 connects an end of an RTP pipe 181 to another equipment 182 (e.g., a manifold, an equipment junction, a storage container, or other equipment having a flow path port). As shown, the connection system 180 includes a coupler 183, a single set of wedges 185, and a single flange 186. The coupler 183 has an annular body with a radial extension 179 and single socket extension 184 extending from a first side of the radial extension 179. A terminal connection side is provided along the radial extension 179 opposite the first side, where the terminal connection side is configured to mate with or correspond to an equipment connection 187. In some embodiments, a terminal connection side of a coupler may be a flat surface, which may be positioned flush against a corresponding flat surface of an equipment connection.

The end of the RTP pipe 181 is thermoplastic welded to the socket extension 184 of the coupler 183. The set of wedges 185 is assembled around the outer circumference of the coupler/pipe thermoplastic connection, and the flange 186 is tightened around the set of wedges 185 such that the wedges 185 are sandwiched between the flange 186 and the coupler/pipe thermoplastic connection. The coupler 183 and flange 186 are connected to an equipment connection 187 (e.g., a metallic flange connection) using connectors 188 (e.g., bolts or screws).

Figure 4B:
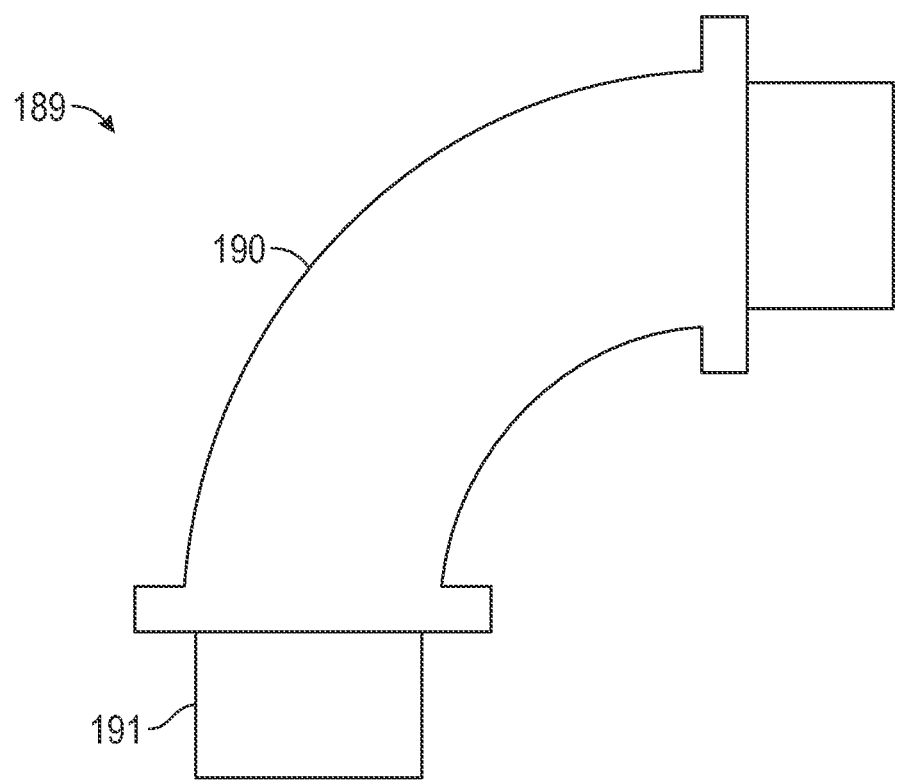
FIG. 4B shows another example of a coupler according to embodiments of the present disclosure.

In other embodiments, a connection system utilizing a combination of thermoplastic welding and mechanical connection components according to embodiments of the present disclosure may be used for a turn connection. In such embodiments, the connection system may include a coupler with an annular body having at least one turn in direction along the flow path formed therethrough, where one or both axial ends of the coupler may have a socket extension for thermoplastic welding to an RTP pipe end. For example, FIG. 4B shows an example of a coupler 189 having an annular body 190 with a turn formed between the ends of the annular body 190. In the embodiment shown, the annular body 190 includes radial extensions formed at its ends, where socket extensions 191 extend from each of the radial extensions at the ends of the annular body 190. In other embodiments, a socket extension may be formed at only one end of the annular body, while the other end of the annular body may have a radial extension with a terminal connection side (e.g., a flanged end) for a terminal connection.

Figure 4C:
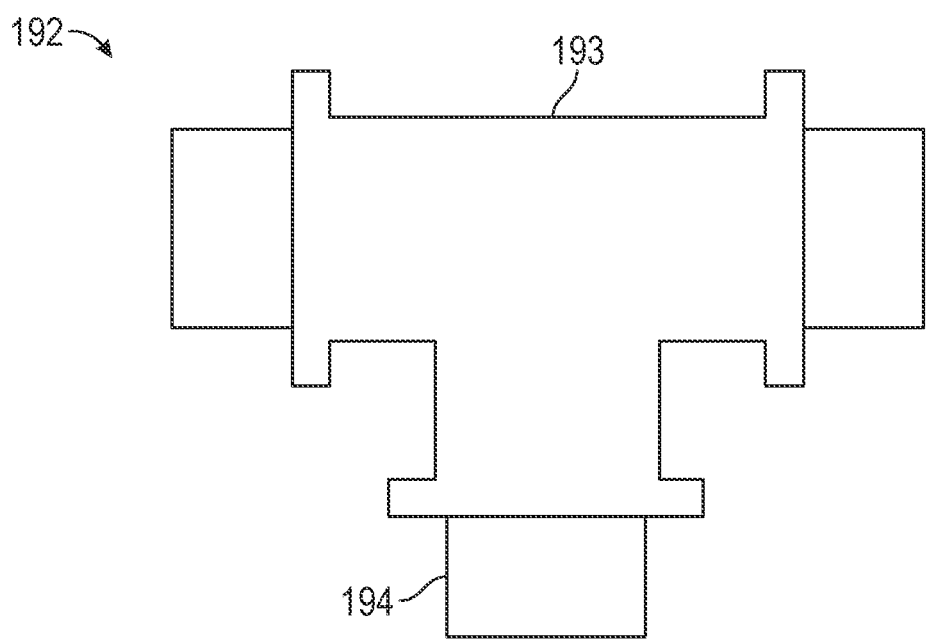
FIG. 4C shows another example of a coupler according to embodiments of the present disclosure.

In some embodiments, a connection system utilizing a combination of thermoplastic welding and mechanical connection components according to embodiments of the present disclosure may be used for a multi-way connection (e.g., a three-way connection or a four-way connection). In such embodiments, the connection system may include a coupler with an annular body that forms an intersection of multiple flow paths. For example, FIG. 4C shows an example of a coupler 192 for a three-way connection, where the annular body 193 of the coupler 192 forms the intersection between the three branch flow paths. In the embodiment shown, the coupler 192 has a T-shape. Socket extensions 194 may extend from one or more ends of the annular body along the different branches, where an RTP pipe end may be thermoplastic welded to each socket extension, and a mechanical connection system may be connected around the thermoplastic weld. In the embodiment shown, a radial extension may be formed at each branch end of the annular body, and the socket extensions 194 may extend from each of the radial extensions. In other embodiments, at least one of the branch ends of the coupler may have a radial extension with a terminal connection side (without a socket extension), which may be connected to an equipment connection. For example, in some embodiments, a socket extension may be formed at two branches of the annular body, while one branch of the annular body may be a flanged end for a terminal connection.

Figure 4D:
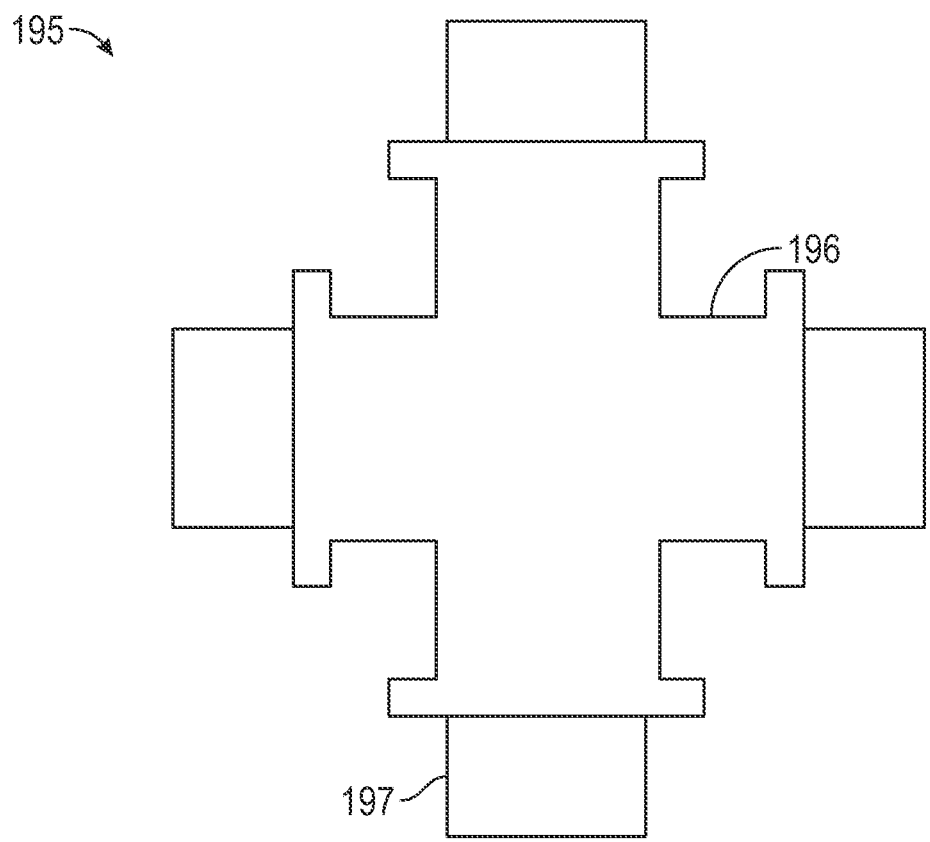
FIG. 4D shows another example of a coupler according to embodiments of the present disclosure.

As another example, FIG. 4D shows a coupler 195 that may be used for a four-way connection. The coupler 195 has a cross ("+") shape, where the annular body 196 of the coupler forms the intersection between four branch flow paths. Socket extensions 197 may extend from one or more ends of the annular body along the different branches, where an RTP pipe end may be thermoplastic welded to each socket extension, and a mechanical connection system may be connected around the thermoplastic weld. In the embodiment shown, a radial extension may be formed at each branch end of the annular body, and the socket extensions 194 may extend from each of the radial extensions. In other embodiments, at least one of the branch ends of the coupler may have a radial extension with a terminal connection side (without a socket extension), which may be connected to an equipment connection.

Other connection types may be envisioned, where a socket extension of a coupler may be thermoplastic welded to an RTP pipe end, and a mechanical connection system may be connected around the thermoplastic weld connection to both thermoplastically and mechanically connect RTP pipe to a coupler.

RTR Couplers

According to embodiments of the present disclosure, a coupler can be adapted to any pipe dimension and fully independent on pipe design. As such, couplers according to embodiments of the present disclosure may be particularly suitable for retrofit to existing RTP installations. Additionally, a coupler may be sized and shaped to both mate with a pipe being joined and with a mechanical connection system. In such manner, the coupler may integrate the mechanical connection system into the connection between the RTR coupler and the pipe being joined.

Figure 5:
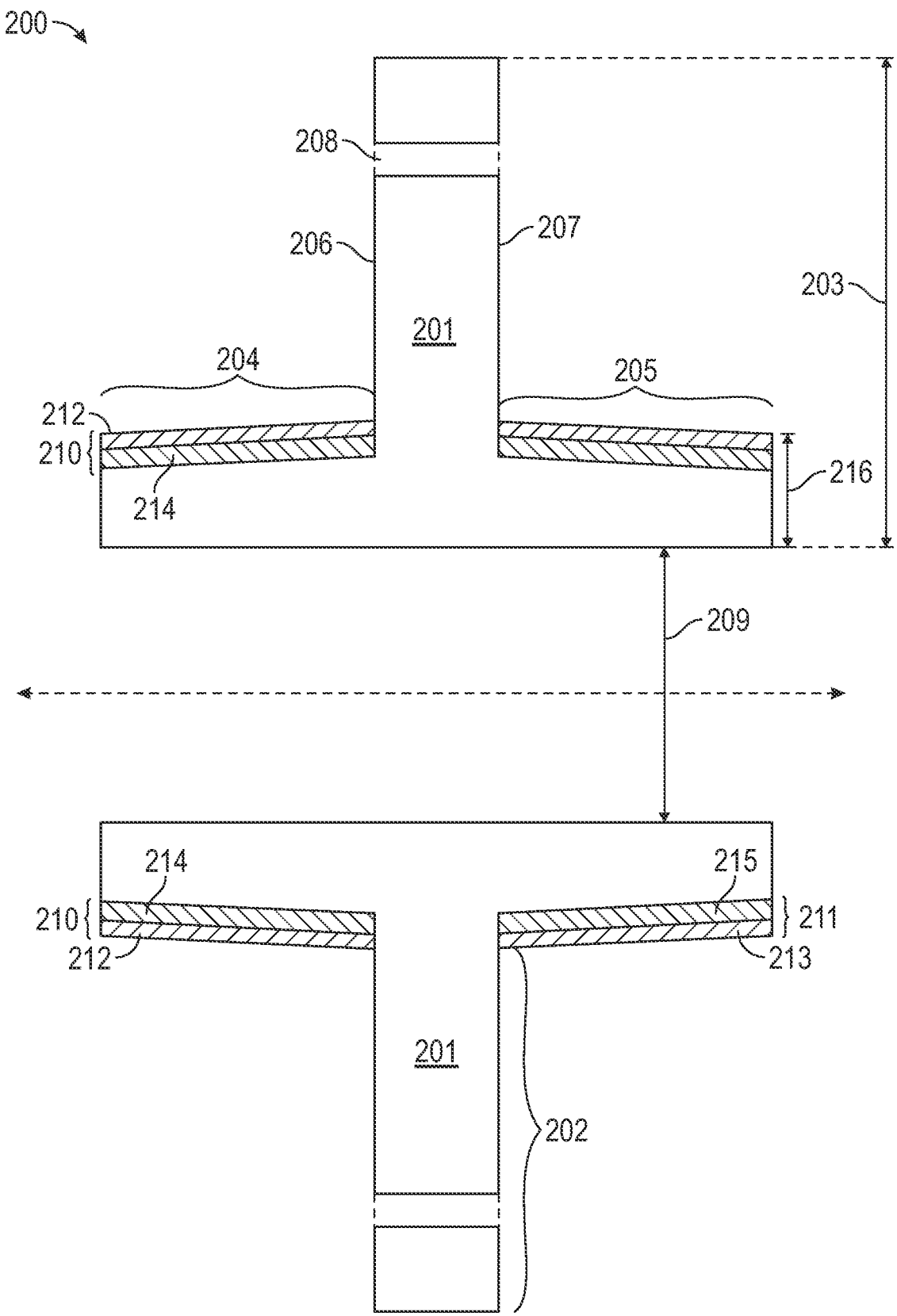
FIG. 5 shows a tight-fitting assembly step according to methods of the present disclosure.

FIG. 5 shows a detailed cross-sectional view of an example of a coupler 200 according to embodiments of the present disclosure. The coupler 200 has an annular body 201 with an inner surface defining an inner diameter 209, where the annular body includes a central radial extension 202 extending a radial distance 203 from the inner surface, a first socket extension 204 extending axially from a first side 206 of the radial extension 202, and a second socket extension 205 extending axially from a second side 207, opposite the first side, of the radial extension 202.

The annular body 201, including the radial extension 202, the first socket extension 204, and the second socket extension 205 are integrally formed of an RTR material. The RTR material may be selected from, for example, Glass Reinforced Polyester (GRP), Glass Reinforced Vinylester (GRV), and Glass Reinforced Epoxy (GRE). According to embodiments of the present disclosure, the RTR coupler body may be manufactured in one bloc (e.g., using a filament winding process).

A plurality of through-holes 208 are spaced circumferentially around the radial extension 202 and extend through the width of the radial extension, from the first side 206 of the radial extension to the opposite second side 207 of the radial extension. Through-holes 208 may be spaced apart from the outermost surface of the radial extension and circumferentially spaced apart from each other such that enough material is provided around the through-holes to prevent or inhibit breakage. For example, through-holes 208 may be positioned radially along the radial extension at a distance ranging between about 50 and 90 percent of the radial distance 203 of the radial extension 202 from the inner surface. Depending on, for example, the RTR material forming the radial extension, the size of the radial extension (radial distance and width), and the size of the through-holes, through-holes may be provided at other radial positions along the radial extension. Further, according to embodiments of the present disclosure, through-holes may be provided at the same radial distance in equally circumferentially spaced positions around the radial extension.

A first thermoplastic tie layer 210 is bonded around an outer surface of the first socket extension 204, and a second thermoplastic tie layer 211 is bonded around an outer surface of the second socket extension 205. The first thermoplastic tie layer 210 and the second thermoplastic tie layer 211 are each made of a thermoplastic material and a susceptor material. For example, in the embodiment shown, each of the first thermoplastic tie layer 210 and the second thermoplastic tie layer 211 is made of a top layer 212, 213 of the susceptor material deposited on a base layer 214, 215 of the thermoplastic material. In some embodiments, thermoplastic tie layers may be made of a susceptor-thermoplastic composite, where susceptor material may be dispersed in a thermoplastic matrix.

The thermoplastic material forming the thermoplastic tie layers 210, 212 can either be the same as or different than the thermoplastic material forming the inner liner and/or the outer jacket of RTP pipe being joined by the coupler. However, according to embodiments of the present disclosure, the thermoplastic material forming the tie layers 210, 212 may be selected to be weldable (e.g., have very close melting/solidification temperatures and be melt compatible, i.e., mix well when molten) to the adjoining thermoplastic layer of the RTP pipe. In addition, such thermoplastic materials must be carefully selected to ensure their function throughout the lifetime of the pipe (typically, 25 years). For example, the materials may be selected from those qualified (e.g., as per ISO 23936) to meet the service specifications in terms of design temperature, pressure, and chemical compatibility with the environment (acidic gases, liquids, aromatics contents, etc.).

In general, the selection of the most appropriate thermoplastic material for a tie layer may be driven by: welding compatibility with the RTP pipe material on one side and affinity for mechanical adherence to RTR material of the coupler on the other side; chemical compatibility and resistance to the transported fluids; melting temperature shall not exceed the maximum temperature that causes significant degradation of the thermoset material during the friction deposition process or the secondary welding process (induction in the field); and sufficient mechanical and permeation barrier properties.

Examples of thermoplastics that can be used for a tie layer, include but are not limited to polyolefins (e.g., polypropylenes or polyethylenes), polyvinylidene fluoride (PVDF), polytetrafluoroethylene (PTFE), polyphenylene sulfide (PPS), polyaryletherketones (PAEK), polyethylenimine (PEI), high-density polyethylene (HDPE), polyethylene of raised temperature (PE-RT), aliphatic polyketone (PK), polyetheretherketone (PEEK) (and other polyaryletherketones), polyetherketoneketone (PEKK), polyamide 12 (PA12), polyketone (POK), and their carbon beads or short fiber reinforced grades, and other thermoplastic resins commonly used in the oil and gas industry.

A thermoplastic layer (which may include susceptors, if needed) may be bonded on connection (faying) surfaces of an RTR coupler (e.g., around the outer surfaces of the socket extensions) at the RTR coupler manufacturing stage, or after the manufacture and distribution of an RTR coupler body to an installation site. Various methods can be used to apply and bond the tie layers to a thermoset RTR coupler body. For example, a thermoplastic powder may be thermally sprayed on a faying surface of the thermoset RTR coupler body (with sufficient surface preparation, e.g., sand blasting) or a thermoplastic implant may be applied while the thermoset RTR coupler body is in a partially cured (or uncured) state, followed by co-curing at the required temperature (below the melting temperature of the thermoplastic) to bond a thermoplastic tie layer to the RTR coupler body. In one or more embodiments, the deposition of tie layers may be conducted in the factory at the manufacturing stage. Because the surface preparation of a substrate often conditions the final quality of a coating, a clean and controlled environment (e.g., dust free, temperature regulation, etc.) is advantageous, which is easier to achieve in the manufacturing site.

In some embodiments, a thermoplastic tie layer may be friction welded (e.g., using a friction welding tool) around a faying surface (e.g., an outer surface of the socket extensions) of an RTR coupler body, where the RTR coupler body is a single, integrally formed body of RTR material. For example, a thermoplastic tie layer may be friction welded to faying surfaces of an RTR coupler body using a rotary friction welding process, where one component (e.g., a sleeve forming the thermoplastic tie layer) may be rotated against the other component being joined (e.g., the RTR coupler) to cause enough friction work to heat and thermally weld the components together. In such embodiments, the RTR coupler geometry may include tapered socket extensions, which may correspond with the geometry of the thermoplastic tie layer sleeve, such that the thermoplastic tie layer sleeve may be rotated against and axially forced against the tapered socket extensions.

For example, the coupler 200 shown in FIG. 5 includes first and second socket extensions 204, 205 having a tapered thickness 216 in a direction from an inner end proximate the annular body 201 to an outer end distal from the annular body 201. According to embodiments of the present disclosure, the tapered geometry of the socket extensions may be maintained after application of the thermoplastic tie layers, or the tapered geometry of the socket extensions may be machined away after or during application of the thermoplastic tie layers. A tapered socket extension geometry may be provided on the coupler body, for example, by machining the tapered thickness or during manufacture of the coupler body.

Prior to friction welding, friction weld faying surfaces may undergo surface preparation in the factory (e.g., via grit blasting/sanding) to provide sufficient roughness and contact forging force to promote heat generation during the rotary friction process and deposition of the thermoplastic tie layers onto the reinforced thermoset coupler ends. Surface preparation is important in friction welding components as it not only contributes to both the means of adherence between the faying materials, but also the frictional properties of the faying surfaces and therefore the rate at which frictional heat is generated in the joining process.

In some embodiments, a top layer of susceptor may be deposited around a base layer of thermoplastic material after the thermoplastic material has been friction welded to the RTR coupler body. For example, as shown in FIG. 5, the base layer 214, 215 of thermoplastic material is friction welded onto the RTR coupler body 201 and machined to a desired bond line thickness. Upon solidification of the base layer 214, 215, a top layer 212, 213 of susceptor material (e.g, carbon fibers or copper wires) is deposited on top of the base thermoplastic layers 214, 215. As discussed more below, the susceptor material may be used for a second welding process (taking place in the field during installation). Using an appropriate welding process (e.g., electrofusion or induction), the circulation of an electric current inside the susceptor material will generate sufficient heat via Joule effect to melt and fuse the thermoplastic tie layers 210, 211 to RTP pipe.

The susceptor material may be selected from at least one of silicon carbide, molybdenum, graphite, stainless steel, aluminum, and other conductive materials. The type and location of the susceptor material may be selected to prevent a preferential leak path and reduce the permeation resistance of the connection, whether this be via adjacent continuous carbon fibers, between locally contacting short fibers, or electrically conducting particles. In other words, the type and location of the susceptor material in thermoplastic tie layers may be selected such that the electrical percolation network is not also a permeation network.

Methods

According to embodiments of the present disclosure, a coupler having at least one socket extension made with RTR material may be used to connect the axial end(s) of RTP pipe. For example, connection methods according to embodiments of the present disclosure may generally include providing a coupler with an annular body having one or more socket extensions with a thermoplastic tie layer provided around its outer surface. An end of an RTP pipe may then be fitted around each socket extension, wherein the RTP pipe has an inner surface made of a thermoplastic material. Heat may then be applied to the fitted pipe end(s) to thermoplastic weld the inner surface of the RTP pipe ends to the thermoplastic tie layer of the socket extension(s).

In one or more embodiments, after thermoplastic welding the coupler to the RTP pipe, a mechanical connection system may be secured around the thermoplastic weld to mechanically secure the RTP pipe to the coupler.

Examples of methods according to embodiments of the present disclosure are discussed below with reference to FIGS. 6-8.

Figure 6:
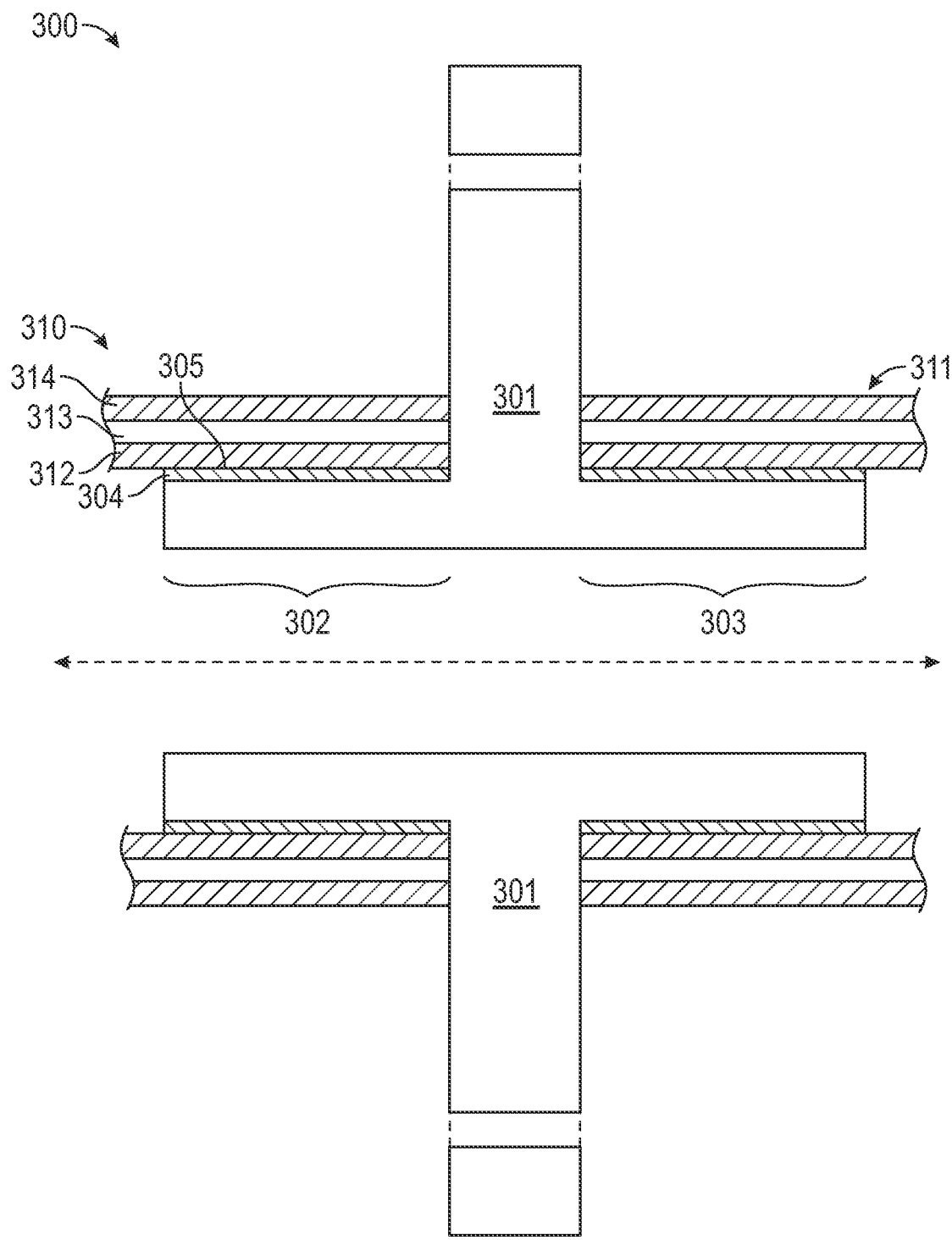
FIG. 6 shows an example of a heating step to form a thermoplastic weld according to methods of the present disclosure.

As shown in FIG. 6, methods according to embodiments of the present disclosure include providing a coupler 300 with an annular body 301 having a first socket extension 302 and a second socket extension 303 extending in opposite axial directions. The annular body 301 is made of an RTR material, wherein the first and second socket extensions 302, 303 each have a thermoplastic tie layer 304 provided around an outer surface of the socket extensions. The thermoplastic tie layers 304 have a susceptor material 305 incorporated. For example, a thin layer of susceptor material such as carbon fibers or copper wires may be deposited on top of a thermoplastic base layer to provide thermoplastic tie layers, or susceptor material may be dispersed within a thermoplastic matrix.

A first end of a first RTP pipe 310 may then be fitted around the first socket extension 302 and a second end of a second RTP pipe 311 fitted around the second socket extension 303. The RTP pipe 310, 311 include an inner thermoplastic liner 312 (forming an inner surface of the pipe), at least one fiber reinforcement layer 313 layered around the inner thermoplastic liner 312, and an outer thermoplastic jacket 314 layered around the fiber reinforcement layer 313. The thermoplastic tie layers 304 may be made of the same thermoplastic material as the inner surfaces of the RTP pipe 310, 311, or a thermoplastic material close enough in characteristics (e.g., melting temperature) to enable welding compatibility with the inner surfaces of the RTP pipe 310, 311. According to embodiments of the present disclosure, the faying surfaces of the RTP pipe 310, 311 and thermoplastic tie layers 304 may be cleaned (e.g., using alcohol) before tight fitting the coupler 300 and RTP pipe together.

According to embodiments of the present disclosure, an RTR coupler integrating thermoplastic tie layers (including welding susceptors) on connection sides may be manufactured in a factory, such as described above, and then transported to an installation site, ready to be used. At the installation site, the RTP pipe ends may be tight fitted onto the "functionalized" RTR coupler to bring in close contact the thermoplastic inner surface of the RTP pipe to the thermoplastic tie layer bonded onto the RTR coupler, as shown in FIG. 6. The fitted-together "functionalized" RTR coupler and RTP pipes may be subsequently jointed by applying sufficient heat (e.g., by electrofusion, induction welding, resistive welding process, or other type of welding appropriate to thermoplastic welding) to melt and fuse the thermoplastic layers to each other. Upon cooling, a fully bonded and sealed joint is formed.

Figure 7:
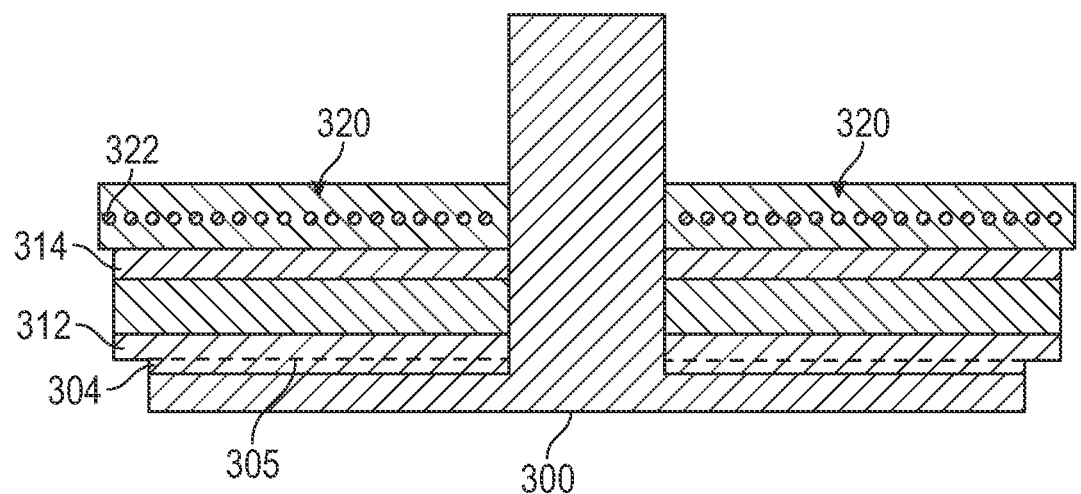
FIG. 7 shows an example of a mechanical connection step according to methods of the present disclosure.

For example, as shown in FIG. 7, once the RTP pipe ends are in place, an induction welding system 320 is provided around the fitted-together ends to melt, fuse, connect and seal the internal RTP liners 312 to the thermoplastic tie layers 304 of the coupler 300. The induction welding system 320 includes an induction coil 322 wound around and spaced apart (e.g., a few millimeters) from the pipe outer jacket 314. For example, induction coils may be encapsulated by a non-ferrous material (e.g., a plastic) to control the distance between the induction coils and the pipe and/or to make sure the coils stay coaxial to the pipe. Upon application of an electric current, a magnetic field is generated which induces an electric current in the in the susceptor material 305 that will trigger (via Joule effect) heating of the susceptor material 305 and melting of the surrounding thermoplastic materials (thermoplastic tie layer 304 and RTP inner thermoplastic liner 312). The energy used with induction welding may be in the order of 1.5 kW for 5 seconds, for example, to melt the thermoplastic tie and liner interface. Optimized coil design and parameter tuning may be performed to decrease the energy consumption of the induction welding process. After the induction process for thermoplastic welding is complete, the induction welding system 320 is removed.

After cooldown from thermoplastic welding, the thermoplastic weld between the RTP pipe 310, 311 and the coupler 300 becomes effective, and the two RTP pipes 310, 311 are sealed and coupled together.

According to embodiments of the present disclosure, after thermoplastic welding RTP pipe to a coupler, a mechanical connection system may be used to mechanically connect the RTP pipe to the coupler. In some embodiments, a mechanical connection system may include flanges that may be connected around the RTP pipe and connected to the coupler via connectors (e.g., bolts or screws).

Figure 8:
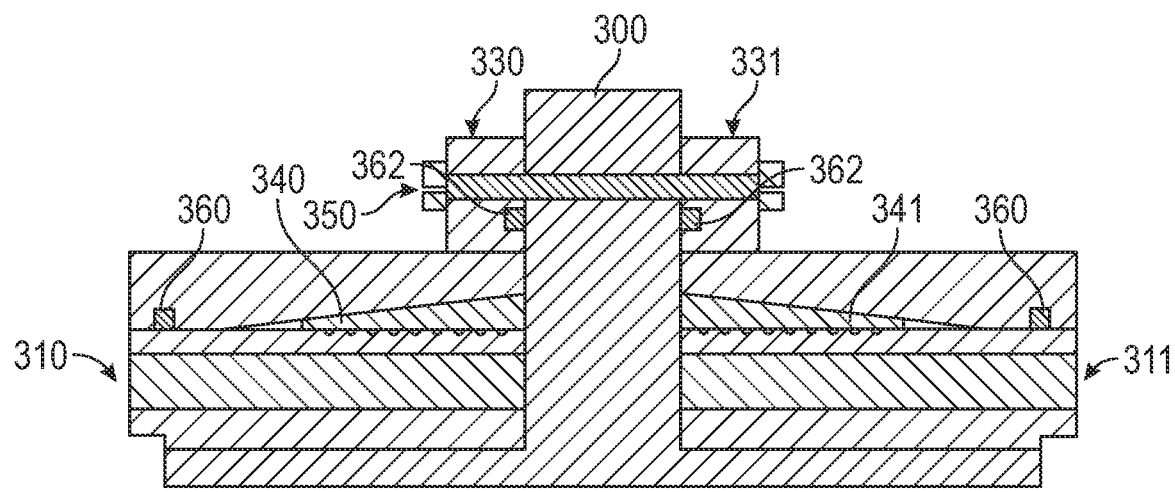
FIG. 8 shows an example of a connection system according to embodiments of the present disclosure.

For example, as shown in FIG. 8, after thermoplastic welding the RTP pipe 310, 311 to the coupler 300, as shown in FIG. 7, the coupler/pipe thermoplastic connection is locked using a mechanical connection system that includes flanges 330, 331 and wedges 340, 341. To make up the mechanical connection, a first set of wedges 340 is assembled circumferentially around an outer surface of the first RTP pipe 310 end, and a second set of wedges 341 is assembled circumferentially around the outer surface of the second RTP pipe 311 end. Various techniques may be used to hold wedges around the outer surface of the coupler/pipe connection until a flange may be properly fitted around the set of wedges. For example, in some embodiments, wedges may be held circumferentially around a coupler/pipe connection outer surface by interlocking adjacent wedges together (e.g., via interlocking features such as grooves/protrusions formed at the sides of the wedges). In some embodiments, wedges may be held circumferentially around a coupler/pipe connection outer surface using a temporary tacking or adhesive.

A first flange 330 is then positioned around the first set of wedges 340 to sandwich the first set of wedges 340 between the first flange 330 and the first RTP pipe 310, and a second flange 331 around the second set of wedges 341 to sandwich the second set of wedges 341 between the second flange 331 and the second RTP pipe 311.

According to embodiments of the present disclosure, flanges may be slid onto the ends of the RTP pipe (in an orientation suitable for later connection around the RTR coupler) before tight fitting the RTP pipe to the coupler. By pre-installing the flanges around the RTP pipe ends, the flanges may be simply slid into position for connection around the coupler after the thermoplastic weld process. In other embodiments, a mechanical connection system may include flange segments or clamps, which may be assembled and tightened around the RTP pipe ends with or without wedges after the thermoplastic weld process.

Referring again to FIG. 8, after the wedges 340, 341 are sandwiched between the RTP pipe 310, 311 and the flanges 330, 331, the flanges 330, 331 are pushed toward each other to tighten the wedges 340, 341 against the RTP pipe 310, 311 (via force transfer across the correspondingly sloped interfacing surfaces between the wedges and flanges). The first flange 330 is tightened against a first side of the coupler body, and the second flange 331 is tightened against a second side of the coupler body using a series of connectors 350 (e.g., bolts, end caps, nuts, screws, etc.). For example, as shown, a bolt is inserted through a through-hole extending through the first flange 330, the annular body of the coupler 300, and the second flange 331, where nut(s) are tightened on the bolt to tighten the first and second flanges 330, 331 against the coupler 300. Upon tightening, the flanges 330, 331 exert a radial pressure over the regularly spaced wedges 340, 341 (in the circumferential direction), which tightens the RTP pipe ends around the coupler socket extensions. According to embodiments of the present disclosure, the internal surfaces of the wedges may be designed to have some roughness to prevent slippage between wedges and the RTP pipe.

Additionally, in some embodiments, assembling a mechanical connection system around an RTP pipe and coupler connection may include assembling one or more sealing components between the mechanical connection components. For example, as shown in FIG. 8, after cooldown of the thermoplastic welding step and complete sealing of the coupler to RTP pipe, and after the thermoplastic welding equipment is removed, the mechanical connection system is set up by assembling o-rings 360, 362 between the flanges 330, 331 and the coupler/pipe connection. O-rings may be assembled around the RTP pipe being connected prior to tight fitting the RTP pipe to the coupler. In other embodiments, a different type of sealing component (e.g., a sealing compound) may be assembled around the RTP pipe after tight fitting the RTP pipe to the coupler. The sealing components may be used to prevent external fluid ingress into the RTP structure.

In the embodiment in FIG. 8, pipe o-rings 360 are assembled around the RTP pipe 310, 311 before the RTP pipe 310, 311 is tight fitted to the coupler 300. After the thermoplastic welding step, the pipe o-rings 360 are then sandwiched between the flanges 330, 331 and the outer surface of the RTP pipe 310, 311 to seal the interface between the flanges 330, 331 and RTP pipe 310, 311. In some embodiments, the pipe o-rings may be pre-assembled to the inner surface of the flanges.

Additionally, in the embodiment in FIG. 8, coupler o-rings 362 are assembled around the RTP pipe 310, 311 or around the coupler 300 before the RTP pipe 310, 311 is tight fitted to the coupler 300. After the thermoplastic welding step, the coupler o-rings 362 are then sandwiched between the flanges 330, 331 and the body of the coupler 300 to seal the interface between the flanges 330, 331 and coupler 300. In some embodiments, the coupler o-rings may be pre-assembled to the coupler. In some embodiments, coupler o-rings may be positioned around the coupler radially inward from a flange connector (e.g., connector 350 in FIG. 8) in order to seal the interface between the coupler and the flanges from potential fluid ingress through the flange connector.

According to embodiments of the present disclosure, coupler/pipe connections can be reversible, e.g., for pipe repairs or for re-use of the coupler or RTP pipe. A coupler/pipe connection may be disconnected by first disassembling any mechanical connection system around the coupler/pipe connection and then heating the coupler/pipe connection until the thermoplastic weld between the RTP pipe and the coupler melts, at which point the RTP pipe and the coupler may be pulled apart.

For example, the coupler/pipe connection shown in FIG. 8 may be disconnected by first disassembling the flanges 330, 331 (by disconnecting the connectors 350) and the wedges 340, 341 from the connection. Heat may then be applied around the ends of the RTP pipe 310, 311 to un-weld the thermoplastic weld (e.g., using the same induction welding system used to make the thermoplastic weld or a different heating system). The ends of the RTP pipe 310, 311 may then be removed from the socket extensions of the coupler 300. After disassembly, the coupler can re-used for the same purpose or the thermoplastic tie layers can be removed/machined and new thermoplastic tie layers deposited again.

Embodiments of the present disclosure may provide at least one of the following advantages.

Conventional metallic RTP connections offer good strength properties but ultimately corrode, which cause extra maintenance costs, and the sealing performance usually relies on o-rings, which require regular maintenance. Conventional non-metallic RTP connections may present good sealings properties but limited pressure capacity due to the intrinsic weakness of common thermoplastic materials in terms of mechanical properties and durability. Alternatively, conventional non-metallic RTP connections can present good mechanical performance when relying on a fiber reinforced thermoset coupler, but the sealing capacity is limited by reliance on o-rings.

In contrast to the limitations of conventional RTP pipe connections, embodiments disclosed herein may provide optimal sealing performance due to the full thermoplastic circumferential seal obtained successively from friction welding (thermoplastic tie layer to a thermoset coupler) and thermoplastic welding (thermoplastic tie layer to the RTP pipe). Embodiments disclosed herein may also provide optimal mechanical performance as structural loads may be transferred via a thermoplastic interlayer between an RTR coupler and the RTP pipe liner and between the mechanical connection system (e.g., via wedges assembled around the outer jacket of the RTP pipe). The fiber reinforced thermoset (RTR) material of the RTR coupler can be designed to have sufficient strength to transfer the axial load.

Embodiments of the present disclosure may also reduce or eliminate corrosion risk since inner fluids flowing through the flow path formed through the RTP pipe and coupler are not in contact with any metallic part. Additionally, in embodiments using a mechanical connection system made with one or more or all non-metallic parts (e.g., RTR flanges, RTR wedges, etc.), the risk of corrosion around the exterior of the RTP pipe connection may also be reduced or eliminated.

Additionally, by using connection systems according to embodiments of the present disclosure, the coupler can be easily dismantled via heating, e.g., for repair purpose or re-use.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A connection system, comprising:
   a first pipe having a first end;
   a reinforced thermoset resin (RTR) coupler positioned adjacent the first end of the first pipe,
   the RTR coupler, comprising:
      an annular body having a first socket extension extending into the first end of the first pipe, wherein the annular body comprises an RTR material,
      wherein the annular body of the RTR coupler comprises a radial extension extending in a direction perpendicular from the first socket extension,
      wherein a first flange is connected to the radial extension of the RTR coupler via at least one connector extending through the radial extension; and
   a first thermoplastic tie layer provided between the first socket extension and the first end of the first pipe;
   a first set of wedges positioned circumferentially around an outer surface of the first end of the first pipe; and
   the first flange fitted around the first set of wedges, wherein the first set of wedges is wedged between the first end and the first flange.

2. The system of claim 1, wherein the first set of wedges and the first flange are non-metallic.

3. The system of claim 1, wherein the first pipe comprises an inner liner made of a thermoplastic material, and wherein the first thermoplastic tie layer is made with the thermoplastic material of the inner liner.

4. The system of claim 1, wherein the first thermoplastic tie layer comprises susceptor material.

5. The system of claim 1, further comprising:
   a second pipe having a second end, wherein the second end is fitted onto a second socket extension of the annular body of the RTR coupler;
   a second thermoplastic tie layer provided between the second socket extension and the second end of the second pipe;
   a second set of wedges positioned circumferentially around an outer surface of the second end of the second pipe; and
   a second flange fitted around the second set of wedges, wherein the second set of wedges is wedged between the second end and the second flange.

6. The system of claim 5, wherein the annular body of the RTR coupler forms an intersection between multiple branch flow paths, wherein:
   a first flow path is formed through the first socket extension,
   a second flow path is formed through the second socket extension, and
   an additional flow path is formed through an additional branch of the annular body.

7. The system of claim 1, wherein a second side of the annular body is connected to an equipment connection to provide a terminal connection for the first pipe.

8. The system of claim 1, further comprising a vent port extending through the first flange, wherein the vent port fluidly connects an exterior of the first flange to an interface between the first flange and the annular body.

* * * * *